No. 773,885. PATENTED NOV. 1, 1904.
J. A. McCUNE.
FRUIT PITTER.
APPLICATION FILED SEPT. 29, 1903.
NO MODEL. 4 SHEETS—SHEET 1.

Witnesses:
Inventor,
John A. McCune
By Geo. H. Strong
atty

No. 773,885. PATENTED NOV. 1, 1904.
J. A. McCUNE.
FRUIT PITTER.
APPLICATION FILED SEPT. 29, 1903.
NO MODEL. 4 SHEETS—SHEET 2.

Witnesses:- Inventor,
F. C. Fliedner, John A. McCune
 By Geo. H. Strong
 atty

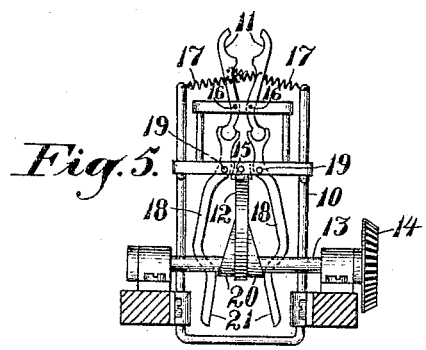
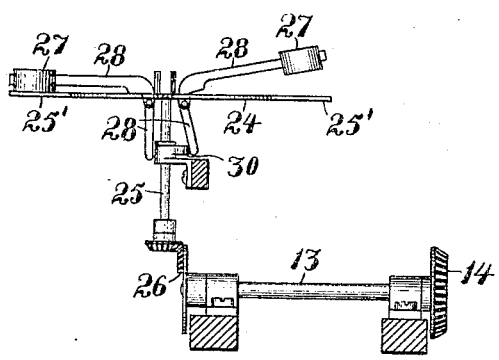
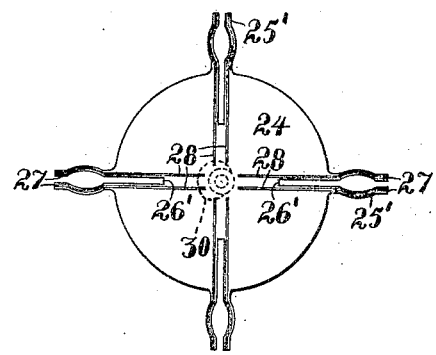

No. 773,885. PATENTED NOV. 1, 1904.
J. A. McCUNE.
FRUIT PITTER.
APPLICATION FILED SEPT. 29, 1903.
NO MODEL. 4 SHEETS—SHEET 4.

Witnesses:— Inventor,
John A. McCune
By Geo. H. Strong
Atty

No. 773,885.

Patented November 1, 1904.

UNITED STATES PATENT OFFICE.

JOHN A. McCUNE, OF SANTA CRUZ, CALIFORNIA.

FRUIT-PITTER.

SPECIFICATION forming part of Letters Patent No. 773,885, dated November 1, 1904.

Application filed September 29, 1903. Serial No. 175,038. (No model.)

*To all whom it may concern:*

Be it known that I, JOHN A. McCUNE, a citizen of the United States, residing at Santa Cruz, in the county of Santa Cruz and State of California, have invented new and useful Improvements in Fruit-Pitters, of which the following is a specification.

My invention relates to improvements in machines for cutting and pitting fruit. Its object is to provide an apparatus for splitting fruit—such as peaches, apricots, and the like—removing the stones therefrom without injury to the meat portions, spreading the stoned fruit upon trays preparatory to drying, and delivering the trays automatically when filled.

It consists of the parts and the construction and combination of parts, as hereinafter more fully described, having reference to the accompanying drawings, in which—

Figure 1:
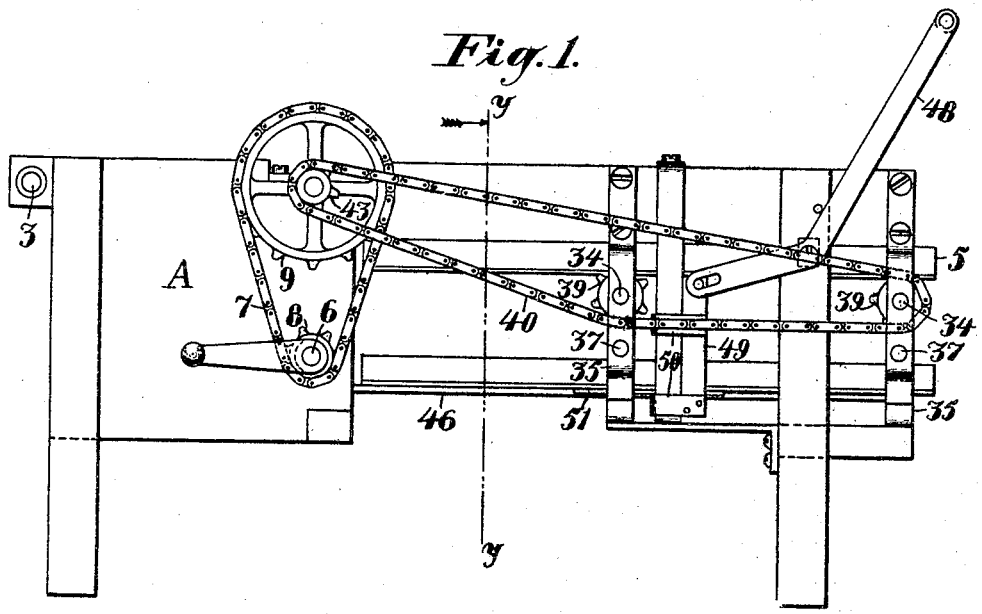
Figure 2:
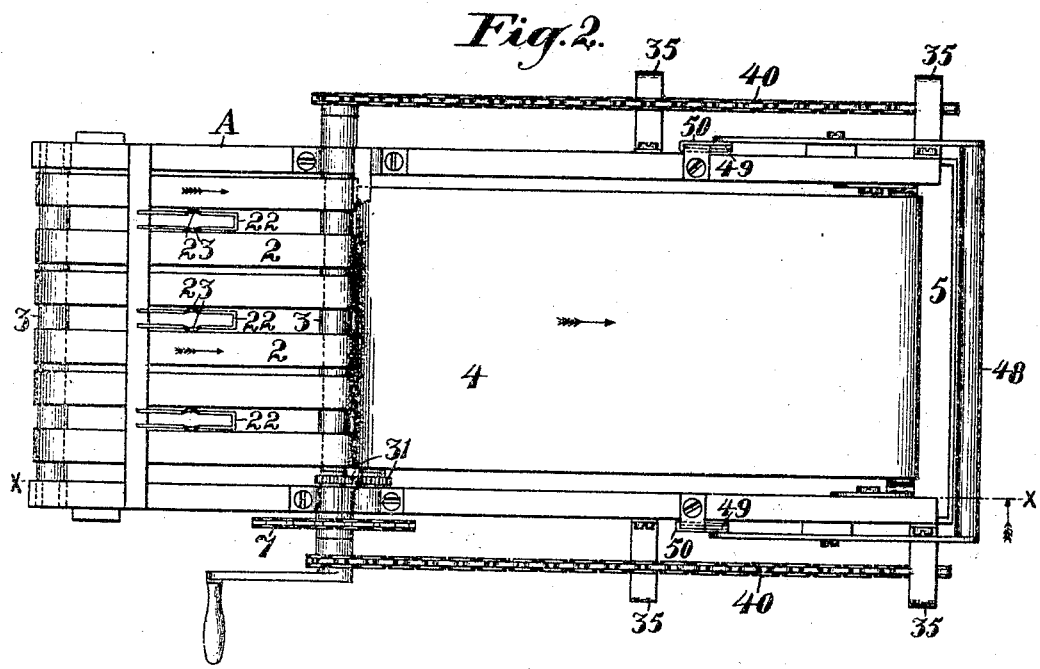
Figure 3:
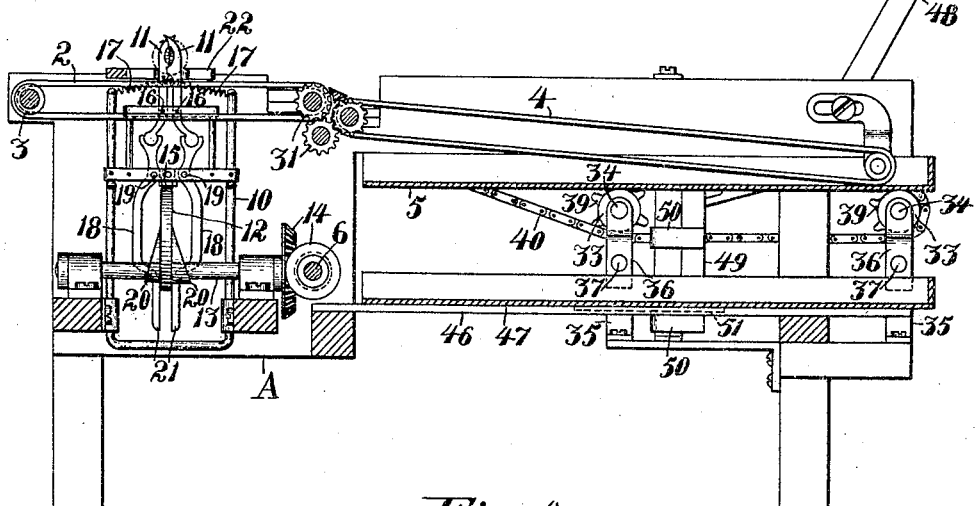
Figure 4:
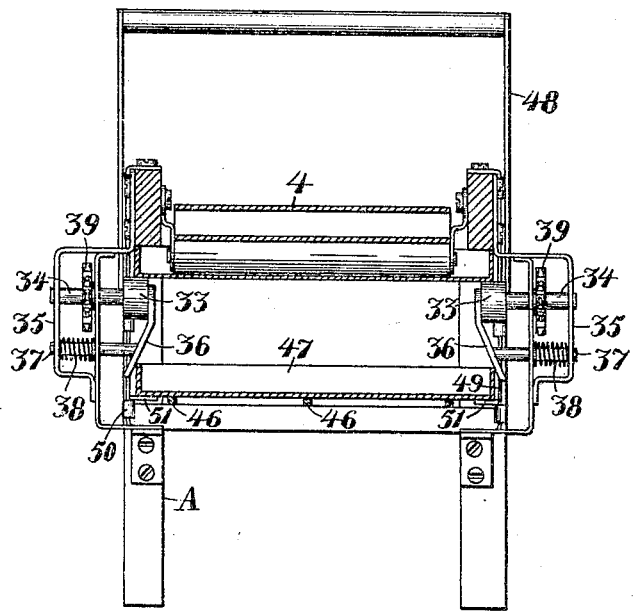
Figure 8:
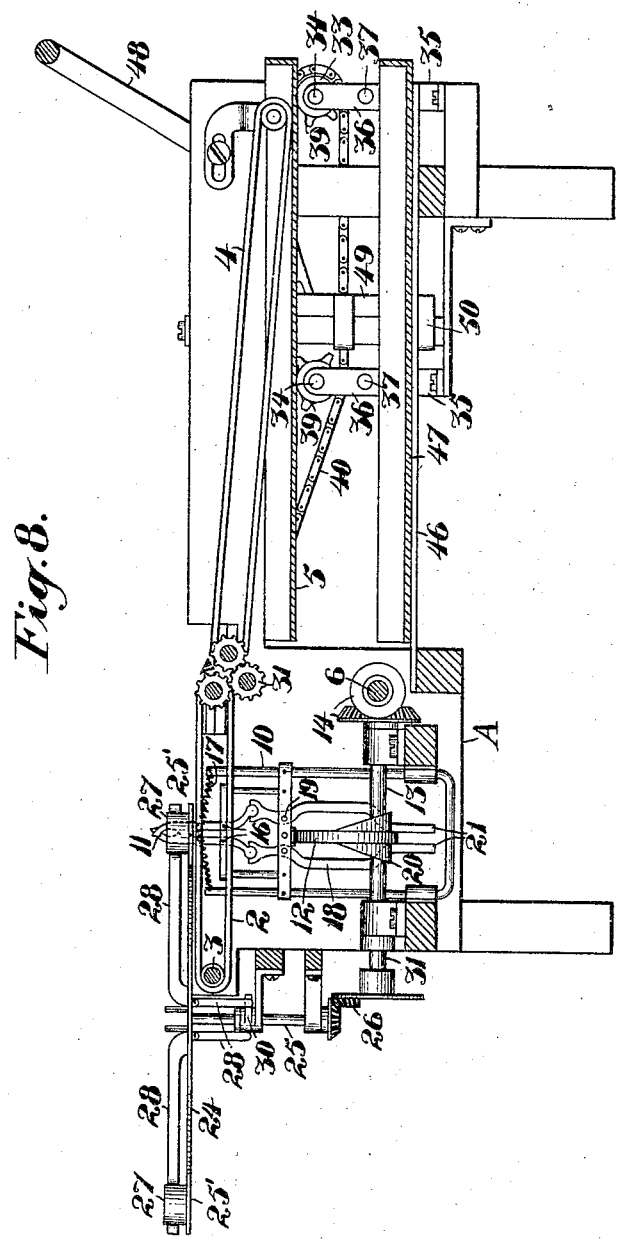

Figure 1 is a side elevation of my apparatus. Fig. 2 is a plan view of same. Fig. 3 is a section taken on line *x x* of Fig. 2. Fig. 4 is a section taken on line *y y* of Fig. 1. Fig. 5 is a view showing knives in open position. Fig. 6 is a modification of feed device. Fig. 7 is a plan of same. Fig. 8 is a view similar to Fig. 3, but showing the means for delivering the fruit automatically into the path of the cutting mechanism.

A represents a suitable framework supporting the several parts of my apparatus.

2 represents a series of parallel-spaced horizontal belts or carriers disposed at the head of the machine and arranged in pairs upon the rollers 3. These belts serve to convey the fruit after it has been cut and the stones removed to the draper 4, which delivers and spreads it upon a tray, as 5. The belts are operated in unison from a drive-shaft 6 through the medium of a chain 7, passing over a sprocket 8 on shaft 6 and a second sprocket 9 on the shaft of one of rollers 3.

The splitting and pitting of the fruit is effected by the following mechanism: 10 is a vertically-reciprocating carriage disposed beneath the belts 2 and carrying the knives 11. A carriage is disposed relative to each pair of conveyer-belts 2, and the knives are arranged to project up between the belts and embrace a peach or apricot when the carriage is lifted and to close upon the peach, seize the pit, and draw it down through the belts when the carriage is retracted beneath again. The carriage is slidable in suitable guides and is reciprocated by means of an eccentric 12 on shaft 13. The latter is driven from shaft 6 through the intermeshing gears 14. The carriage is supported continually during operation on the eccentric, a roller 15 on the carriage providing an antifrictional bearing-surface. When the roller 15 rests on the shortest radius of the eccentric, the carriage is at its lowest point and the knives are below the belts. When the roller is at the highest point on the eccentric, the knives are projected upward between and above the belts. The knives are arranged to operate somewhat after the manner of a pair of pruning-shears. They have each a concaved semicircular cutting edge and are pivoted intermediate of their ends, as at 16. They are held in normally closed position by means of the springs 17. The opening of the knives is effected by means of the arms 18, which are pivoted to the carriage at 19. The upper end of each arm engages the lower end of a knife and extends down on one side of the eccentric, which has a segmental cam-flange 20 upon each side. The arms 18 are curved intermediate of their pivots and their lower ends in order to clear the cams during that time that they are uppermost and when it is desired that the knives should remain closed, while the lower ends of the arms are bent in, as at 21, so as normally to lie close to the eccentric and in the path of the cams.

The operation of the knives and carriage is as follows: When the carriage begins to lift, the reduced portions of the cams begin their engagement with the arms to open out the knives. The latter gradually open wider as the carriage rises, so as to clear the peach or apricot, which is presumed to be held in position immediately above the belts and in the path of the knives. As the carriage reaches its highest point the arms 18 ride off of the cams and the knives close with a sharp sudden movement by reason of the springs 17, cutting the peach in two and closing on the pit. The carriage then descends by gravity, riding all the time on the eccentric 12, and the knives carrying the pit down with them in their grip. When they open again, the pit is discharged, while the two halves of the peach which have fallen on the carrier-belts 2 are taken on toward the draper 4.

Any suitable means may be employed to hold a peach relative to the knives and in readiness for the cutting operation. These holders may consist of the slotted stationary supports 22, arranged above the belts 2 and having a convenient cup-like rest 23 to receive the peach, the opening between the two portions 23 being sufficient to let the pit pass down through. In order, however, that the operator's hands may not be brought into dangerous proximity with the knives, I have shown in Fig. 6 in lieu of supports 22 an automatic feed device which comprises a radially-slotted horizontal disk 24, mounted on the shaft 25, which is rotatable intermittently by any suitable stop mechanism—as, for example, the mutilated gear 26 on shaft 13. The disk 24 is here shown as having four radial projections 25'. The disks are each mounted relative to the slot in which their respective knives operate between the bolts, and a disk and its projection 25' are slotted, as at 26', so that each disk may be turned to bring a slot 26' into a plane coincident with the knives. The slot in each projection is enlarged to allow a pit to be withdrawn through it. A pair of pivoted cup-shaped holders 27 is arranged relative to each projection 25' and slot 26'. Their purpose is to afford a support to the fruit and prevent its rolling off a projection when the disk is being turned to bring the fruit over the knives. These holders 27 are pivoted to the disk and have each an arm 28 projecting therebeneath. During the time a peach is moving up to the knives and during the time it is being split and the pit removed the holders rest on the disk and support the peach. The moment, however, the pitting operation is complete it is desired to lift the holders and allow the sections of fruit to fall onto the bolts 2. Accordingly a cam 30, secured to a fixed point of support, is disposed in the path of the arms 28, so that at each revolution of the disk the arms 28 are tripped to lift holders 27 and release the cut fruit. The several movements of lifting the carriage, opening and closing the knives, the turning of the carrier 24, and the tripping of the holders 27 are so timed that a proper coördination of the various parts of the apparatus will result.

The cut fruit is delivered by the carrier-belts 2 upon the draper 4, which is driven in unison with the belts 2 through the medium of the interengaging gears 31. At the rear end of the draper the fruit is spread upon a tray, as 5, which is adapted to be moved slowly outward in unison with the movements of the belts 2 and draper 4. The tray 5 is supported on and driven by the rollers 33, mounted on axles 34, which latter are journaled and slidable in the stationary brackets 35. The ends of the shafts 34 which carry the rollers project inward and normally beneath a tray, and a downwardly and outwardly curved guide 36 is attached to the end of each shaft and to a rod 37, which latter is also slidable in brackets 35. A spring 38 serves normally to project the rollers inward, as shown. A pair of rollers is disposed at each side of the machine at suitable points, so as to support and balance a tray properly.

The axles 34 carry sprockets 39, around which a chain 40 passes. Power is transmitted to chain 40 from drive-shaft 6 through sprocket 8 on the latter, the chain 7, and sprocket 43 on shaft of sprocket 9.

It is designed that only a single layer of fruit shall be spread in a tray where the fruit is to be dried, and consequently the timing of the movement outward of the tray will depend on the rapidity of the cutting operation and of the delivery of the fruit by the carriers 2 and 4.

Inasmuch as the cutting and delivery of the fruit goes on continuously, it is necessary to provide means for placing fresh trays in position beneath the draper as soon as one tray is filled and delivered.

Beneath the rollers 33 are guides 46, on which an empty tray, as 47, may be supported. When the first tray is filled and run out of the way on the rollers, the empty one may be quickly thrown up into position beneath the draper by means of a lever 48. The lower ends of the arms of this lever connect to links 49, which slide in suitable guide-straps 50 and carry at their lower end the cross pieces or shoes 51, which extend beneath and lengthwise of the tray, which latter may be resting on guides 46. By pressing down on lever 48 the operator lifts tray 47, which engaging the inclined guides 36 presses the rollers 33 outward, allowing the tray to travel upward; but as soon as the tray is above the rollers the latter shoot inward beneath it by reason of the tension of springs 38. As the travel of chains 40 is comparatively slow, there is no danger of their climbing their sprockets when the latter is momentarily thrown out of line by the lifting of a tray into place.

Having thus described my invention, what I claim, and desire to secure by Letters Patent, is—

1. In a fruit-pitting machine, the combination with a supporting-frame and a fruit-holder, of a pair of pivoted cutters having concave edges meeting at both ends when in closed position to encircle the pit completely and sever the fruit, and means for causing the cutters to retain their grip on the pit and to remove said pit.

2. In a fruit-pitting machine, the combination with a supporting-frame, of a fruit-holder, a pair of pivoted cutters having opposed concave cutting edges meeting at both ends when in closed position, to encircle the pit completely, means for closing the cutters to divide the fruit, means for imparting a longitudinal reciprocal movement to the cutters in a plane at substantially right angles to their opening and closing movements while said edges are directly inclosing and gripping the pit, and carrier means for the divided portions of the fruit.

3. In a fruit-pitting machine, the combination with fruit-supporting means, of a pair of pivoted cutters having opposed concave cutting edges meeting at both ends when in closed position, to encircle the pit completely, means to close said cutters to divide the fruit and to cause said edges to encircle and grip the pit between them, means for moving the cutters longitudinally away from the fruit-supporting means, and means for causing the cutters to open and drop the pit out of the way.

4. In a fruit-pitting machine, the combination with means upon which the fruit is supported, of a pair of pivoted cutters having concave edges meeting at both ends when in closed position, to encircle the pit completely and divide the fruit, means for closing the cutters to divide the fruit and grip the pit, means for moving the cutters longitudinally after the pit has been gripped between said edges endless traveling carrier means alongside the fruit-supporting means, and means for causing the cutters to open at the proper moment and drop the pit out of the way.

5. The combination of a supporting-frame, a fruit-holder, a reciprocating carriage, a pair of blades with concave edges pivoted together as shears, and mounted on said carriage;
means for causing the shears to divide the fruit and grasp the pit between them; means for causing the carriage and shears to recede from operating position; means for causing the shears to open at the proper moment and drop the pit out of the way; means for causing shears and carriage to recover operating position; and means for coördinating the movements of the carriage and shears.

6. In a fruit-pitting machine, the combination with a frame, of a slotted holder upon which the fruit is placed, cutting devices reciprocable in the slots of the holder and normally positioned below the holder, said devices having opposed concave edges meeting at both ends when in closed position, to encircle the pit and divide the fruit, means for causing the cutting devices to advance through the holder and to open relative to the supported fruit, means for causing the cutting devices to close to divide the fruit, and grip the pit, and means for causing the cutting devices to recede while in a closed position and gripping the pit whereby said pit is removed.

7. In a fruit-pitting machine, the combination with a frame, of a slotted fruit-holder, cutters operating in said holder, a reciprocable carriage to which the cutters are pivoted, means for reciprocating the carriage, means for opening the cutters in one direction of movement of the carriage, and means for closing the cutters and holding them closed during the return movement of the carriage.

8. In a fruit-pitting machine, the combination with a frame, of a fruit-holder, a pair of pivoted cutters having cutting edges concaved to substantially conform to the pit, a vertically-reciprocable carriage to which the cutters are pivoted, means for reciprocating the carriage, means for opening the cutters in one direction of the movement of the carriage, means for closing the cutters and holding them closed and against the pit during the return movement of the carriage, and an endless conveyer along each side of the fruit-holder.

9. In a fruit-pitting machine, the combination with a frame, and fruit-holding means, of a carriage reciprocable relative to the fruit-holder, a pair of knives pivotally mounted on the carriage and having concaved cutting edges, means for reciprocating the carriage, means for opening said knives during one movement of the carriage, means for closing the knives on the pit, and means for returning the carriage while the knives are closed and embracing the pit.

10. In a fruit-pitting machine, the combination with a frame and fruit-holding means, of a vertically-disposed carriage slidable relative to the holder, a pair of opposed cutters pivoted on said carriage and normally disposed below the fruit-holder, means for moving the carriage to project the cutters above the fruit-holder, means for opening the cutters during said movement of the carriage, means for closing the cutters on the pit, means for returning the carriage to normal position while the cutters are closed, and a carrier at each side of the fruit-holder.

11. In a fruit-pitting machine, the combination of a frame, a fruit-holder, a reciprocating carriage slidable vertically on the frame, a pair of normally closed knives having opposed cutting edges, said knives pivoted on the carriage, means for reciprocating the carriage and knives relative to the fruit-holder, and a cam and pivoted connections engaging the shanks of the knives to open the knives coördinately with one reciprocal movement of the carriage.

12. In a fruit-pitting machine, the combination with a frame, and a fruit-holder, of a cutting mechanism including a carriage slidable on said frame and normally below the top thereof, coöperating knives pivotally mounted on the carriage intermediate of their ends, means for imparting a reciprocal movement to the carriage, means including a cam and pivoted arms between the same and the knives for spreading the latter, and means for closing the knives and holding them closed in contact with the pit during the return movement of the carriage.

13. In a fruit-pitting machine, the combination with a frame and a fruit-holder, of a cutting mechanism including a carriage on the frame and reciprocable in a vertical direction, an eccentric supporting the carriage, a pair of cutters pivotally mounted on the carriage, pivoted arms on the carriage between the cutters and the eccentric, and cams on the eccentric for actuating the arms.

14. A fruit-pitting machine including a supporting-frame, a pair of horizontally-disposed, spaced parallel belts, a fruit-holder positioned vertically above the space between the belts, and horizontally-slotted, cutting members normally below the fruit-holder and belts, and means for moving the cutters vertically through the space between the belts and the slot of the holder to a point above the latter and means for closing the cutters on the fruit held by said holder.

15. A fruit-pitting machine having in combination a pair of spaced parallel belts, a pair of pivoted cutters and means for imparting a traveling movement to the cutters relative to the belts, said cutters operatable in the space between the belts, and means for delivering fruit automatically in the path of reciprocal movement of said members and above the normal position thereof.

16. In a fruit-pitting machine, the combination with spaced parallel belts of cutting devices consisting of a pair of opposing members capable of opening and closing from and toward each other, a vertically-slidable carriage for the members whereby the latter are operatable in the spaces between said belts, and means for delivering fruit automatically into the path of said cutting members.

17. In a fruit-pitting machine, the combination with spaced parallel belts of cutting members operatable in the spaces between said belts, and provided with opposed, segmental cutting edges, means above the belts for holding fruit to be pitted in the path of said members, means for projecting said cutting members from a normal lowered position upward between the belts, means for causing said cutting members when so projected to sever the fruit and embrace the pit and means for retracting said members after the severance of the fruit.

18. In a fruit-pitting machine, the combination of parallel spaced carriers and vertically-reciprocating cutting mechanism operatable in the space between said carriers, of means for delivering the fruit automatically into the path of said cutting mechanism, said means including an intermittently-rotatable slotted support, and fruit-holding means on said support operatable coördinately with the movements of the support.

19. The combination with fruit cutting and delivery mechanism of a movable tray, means for supporting said tray and means for causing it to travel relative to the movements of the fruit cutting and delivery mechanism, said supporting means comprising outwardly-movable spring-pressed carriages, and means for delivering successive trays between said carriages into position relative to said delivery mechanism.

In testimony whereof I have hereunto set my hand in presence of two subscribing witnesses.

JOHN A. McCUNE.

Witnesses:
HENRY P. TRICOU,
S. H. NOURSE.